Figure 1:
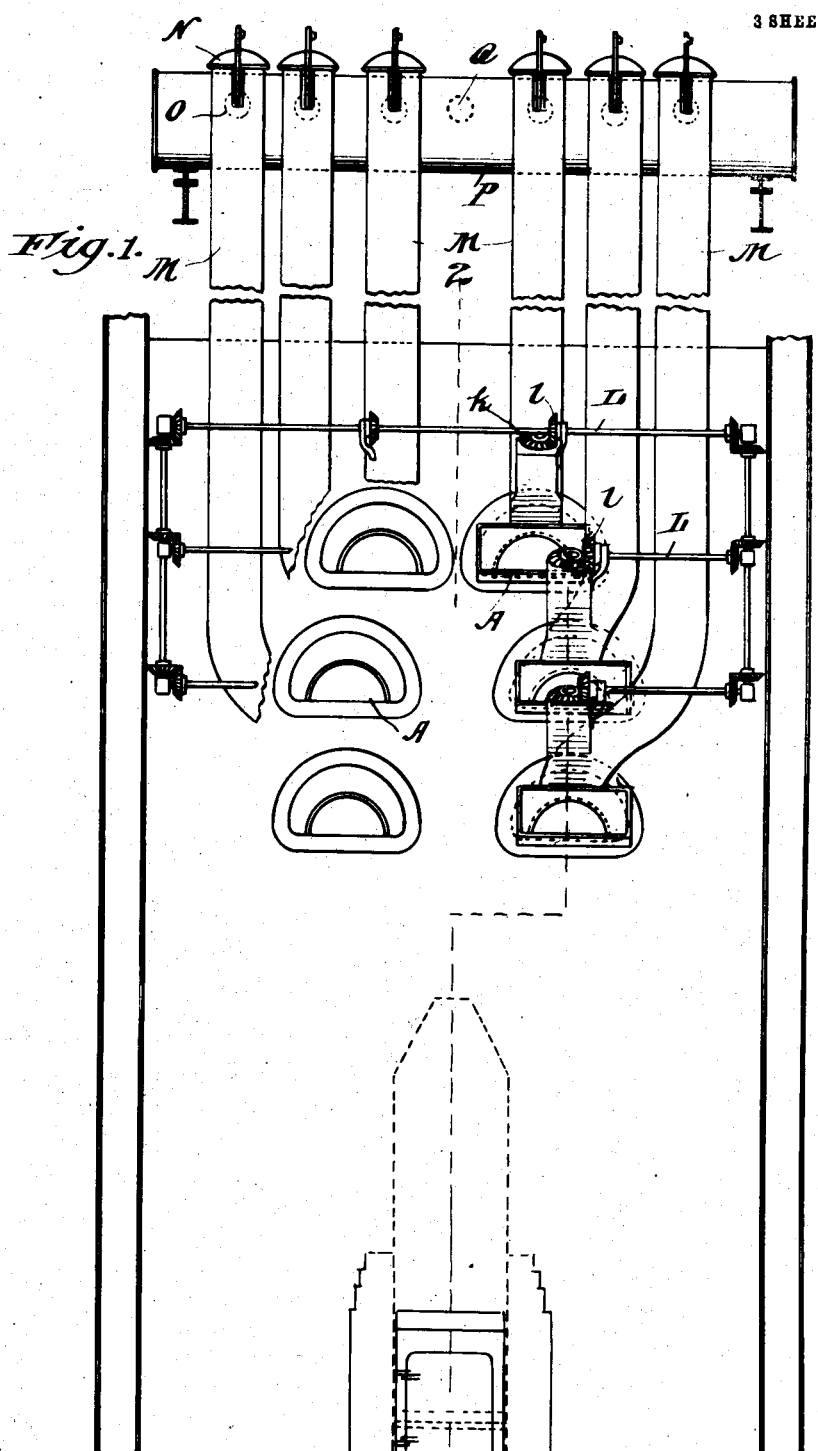

G. G. FLOYD.
MANUFACTURE OF LIME AND GAS.
APPLICATION FILED SEPT. 8, 1908. RENEWED JUNE 3, 1909.

948,045.

Patented Feb. 1, 1910.

G. G. FLOYD.
MANUFACTURE OF LIME AND GAS.
APPLICATION FILED SEPT. 8, 1908. RENEWED JUNE 3, 1909.

948,045.

Patented Feb. 1, 1910.

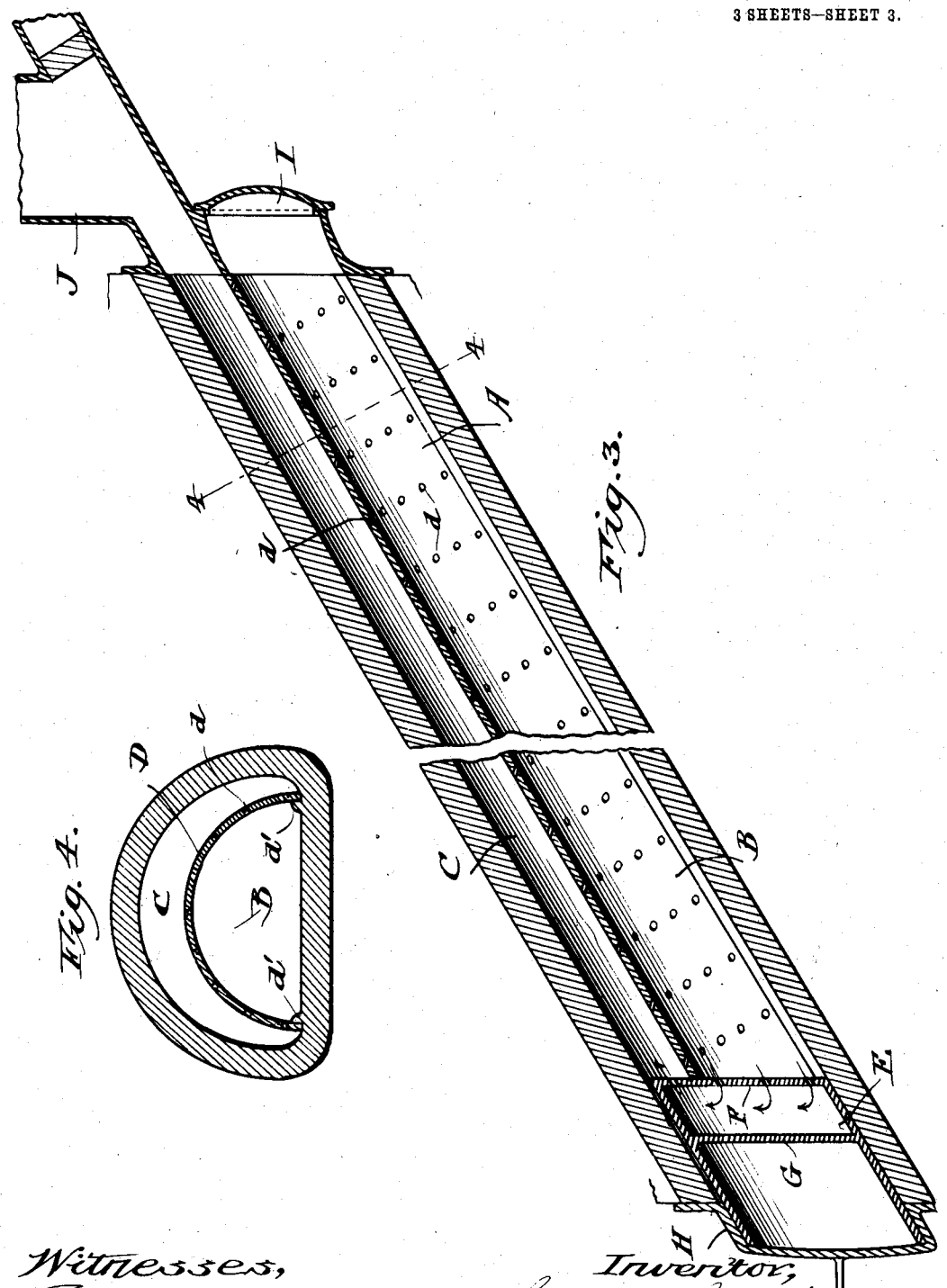

UNITED STATES PATENT OFFICE.

GEORGE G. FLOYD, OF KIRKWOOD, MISSOURI.

MANUFACTURE OF LIME AND GAS.

948,045.  Specification of Letters Patent.  Patented Feb. 1, 1910.

Application filed September 8, 1908, Serial No. 451,959. Renewed June 3, 1909. Serial No. 499,998.

*To all whom it may concern:*

Be it known that I, GEORGE G. FLOYD, a citizen of the United States, residing at Kirkwood, in the county of St. Louis, State of Missouri, have invented certain new and useful Improvements in Manufacture of Lime and Gas, of which the following is a specification.

The object of my invention is to provide an economical method for the simultaneous production of quick lime and carbon monoxid (CO) gas from mineral carbonate (such as limestone) and organic substances (such as charcoal or coke) the operation being conducted in retorts, preferably in series and having air tight connections.

When limestone is heated it evolves carbon dioxid ($CO_2$) according to the reaction expressed by the formula ($CaCO_3$+ heat= $CaO+Co_2$) and as heated carbon reduces carbon dioxid to carbon monoxid (CO) the equation for the change being $CO_2+C= 2CO$ it has been proposed to charge into a closed vessel or air tight retort a close mixture of broken limestone and charcoal or coke, place the retort under a sufficient heat to decompose the mixture, and remove the gas from the retort with an exhauster as it is evolved from the decomposing mixture.

As theoretically it takes approximately 12 lbs. of carbon to reduce the carbon dioxid from 100 pounds of limestone to carbon monoxid, it is further proposed that the mixture shall be in such proportions that the carbon in the charcoal will be equal to about ten to twelve per cent., by weight, of the limestone.

When the carbonaceous material is mechanically mixed with the limestone, ash will be left in the lime and for many purposes this will be a serious objection, as it lowers the grade of the lime. Limestone begins to decompose and evolve $CO_2$ gas at a temperature materially below the temperature at which glowing carbon will reduce $CO_2$ gas to CO gas. Now when it is attempted to produce CO gas from a mixture such as above described, it is necessary to charge such mixture into the retort at a temperature below that required to effect decomposition. In the interval between the decomposing temperature of limestone and the $CO_2$ reducing temperature of glowing carbon, gas will be evolved by the decomposition of the limestone but will not be reduced, and must either be allowed to escape in the atmosphere and be lost or if allowed to pass to the receiver will dilute the gas therein. Further in converting carbon dioxid gas into carbon monoxid gas by the agency of heated charcoal or coke (in accordance with the reaction $CO_2+C+heat= 2CO$) each molecule of the $CO_2$ gas must come into intimate contact with the heated carbon. Now considering the small available heated area of the charcoal to the unit amount of gas evolved from the limestone in a mixture of the proportions above indicated, and the known fact that in the reduction of $CO_2$ gas to CO gas it is necessary to expose a definite area of glowing carbon to a definite volume of the $CO_2$ gas it is apparent that a certain percentage of the $CO_2$ gas may not come into such intimate contact with the heated charcoal as to effect the desired complete conversion. It is obvious, therefore, that a mere mechanical mixture of limestone and carbonaceous material may not present such definite relations of the material as to accomplish the desired result. Again at a certain constant temperature and pressure $CO_2$ gas will be evolved from limestone in a relatively constant volume. But as the process continues the $CO_2$ gas consumes the carbon and its relative bulk becoming smaller its effective area presented for the reduction of the $CO_2$ gas is correspondingly diminished, and the percentage of $CO_2$ gas unreduced will be in an increasing ratio as the decomposition of the limestone proceeds. Therefore the gas evolved during the latter stage of the process will contain a larger percentage of $CO_2$ gas than at the beginning of the process.

When calcium carbonate is heated in a closed vessel it evolves carbon dioxid until a certain pressure of this gas is reached, after which no further change occurs until the conditions are in some way altered. To every temperature there is a corresponding pressure of carbon dioxid which is perfectly definite and constant. When equilibrium is reached at any particular temperature and its corresponding pressure, the calcium carbonate is being decomposed into lime and carbon dioxid at exactly the same rate as lime and carbon dioxid are re-combining to form calcium carbonate. In order, therefore, to completely decompose calcium carbonate by heat, it is necessary to keep the pressure of the carbon dioxid as low as possible and the temperature as high as possible. The time and consequently the economy of decomposing limestone in a closed vessel or retort depends, therefore, upon the work carried on with the $CO_2$ pressure below or at a temperature above that which would established an equilibrium.

In decomposing a mixture of mineral carbonate and carbonaceous material in a retort closed to the outside air, at a constant temperature, removing the gas as evolved, I found that the time required in so doing was proportional to the $CO_2$ pressure in the retort. The lower the working $CO_2$ pressure can be brought below the critical $CO_2$ pressure that would establish an equilibrium at a temperature which it is practical to maintain, the greater the economy in decomposing the calcium carbonate. To sum up, I found that with a mechanical mixture of mineral carbonates and carbonaceous material it was impossible to reduce entirely all of the $CO_2$ gas as it was evolved even at the beginning of a fresh charge, and consequently that a certain $CO_2$ pressure was set up and the speed of decomposing was in proportion to the ratio the $CO_2$ pressure thus set up bore to the critical pressure corresponding to the temperature of the retort; and as the bulk of the glowing charcoal decreased and the $CO_2$ pressure increased the time of decomposition slowed up, the ratio of decrease being progressive as the operation continued and the quantity of gas evolved decreasing, of course, correspondingly. The length of time necessary to the working of the process under these conditions renders the operation more expensive and in addition thereto it was found practically impossible to completely calcine the lime rock.

The object of my invention is the rapid and economical production of fuel gas from mineral carbonate, such as limestone, and carbonaceous material such as charcoal or coke, in such manner that a CO gas practically pure and a thoroughly calcined quick lime free from ash or other impurities are obtained. I have discovered that it is possible to accomplish these objects more perfectly by separating the carbonaceous material from the mineral carbonate during the process, and this I may accomplish by superposing the former upon the latter and passing the carbon dioxid through the incandescent mass of carbonaceous material. This may be accomplished by providing a retort with a diaphragm or partition whereby it is divided into two chambers in one of which the mineral carbonates are contained, the other being charged with carbonaceous material, the partition being perforated so that the carbon dioxid gas may pass freely as it is evolved into the glowing mass of carbonaceous material.

My invention in its broader aspects comprises such a disposition of the materials with reference to each other and such a mode of treatment thereof that the $CO_2$ gas evolved by the decomposition of the limestone will be reduced as formed, thereby avoiding such increased $CO_2$ pressure as would retard the decomposition of the limestone while by the physical separation of the ingredients the intermixture of the residuum or ash with the quick lime is obviated.

My invention consists, therefore, first in the method of treatment above indicated and hereafter particularly described and claimed, and, second, in certain novel apparatus for carrying out said method.

More specifically stated, my invention consists, first, in the method of reducing gas by the decomposition of a mineral carbonate and passing the gas as evolved therefrom into and through incandescent carbonaceous material of such mass and so arranged as to effect the complete reduction thereof, and the novel apparatus forming a part of my invention consists essentially in a novel construction of the retort whereby the materials may be kept separate and whereby also the carbonaceous material may be kept at practically reducing temperature the ash therefrom being prevented from mixing with the lime, and the sensible heat of the CO gas product being utilized to maintain the carbonaceous material at a high temperature.

I will now describe a form of apparatus which is well adapted to the carrying out of my improved process, as will be hereinafter pointed out. Said apparatus is shown in the accompanying drawings in which—

Figure 2:
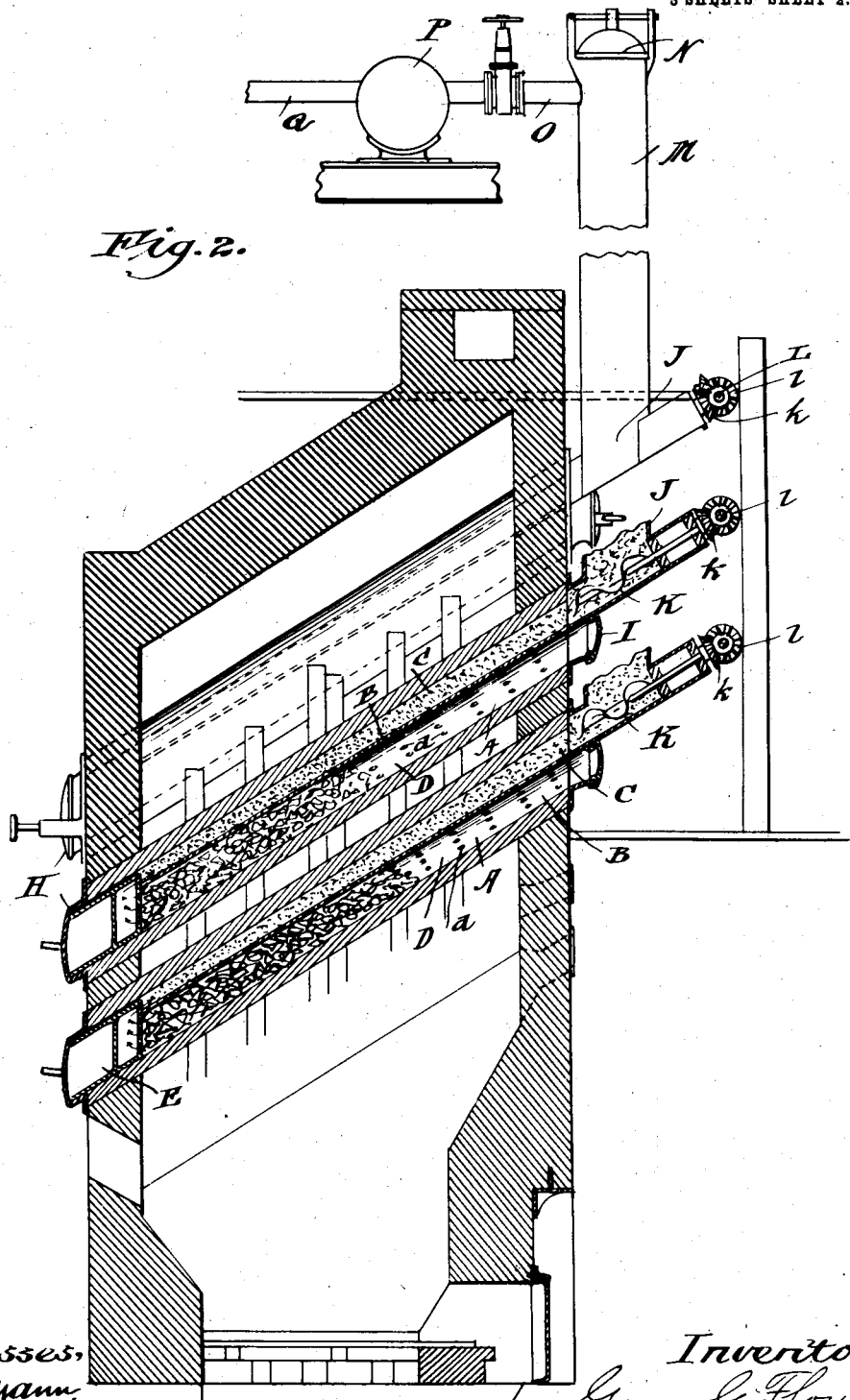

Figure 1 is an elevation with parts broken away. Fig. 2 is a vertical sectional elevation on the line 2—2 of Fig. 1. Figs. 3 and 4 show respectively a longitudinal and a transverse sectional elevation through one of the retorts.

The apparatus shown comprises a series of retorts A, six being a usual number employed in a battery. Each of these retorts is substantially semi-cylindrical in cross section the interior of the retort being further sub-divided into two longitudinal chambers B C by means of a longitudinal curved diaphragm D provided with a series of minute perforations $d$. Each of these perforations preferably has an inclination toward the charging end of the apparatus, as clearly indicated in Fig. 3. This partition D may be made of fire clay and is preferably loosely confined at its lower edges by means of lugs $d'$ on the bottom wall of the retort so as to allow for any warping of the diaphragm without danger of breaking. The lower end of each retort is closed by a suitably shaped, removably inserted casting E having two cross-walls F G, the former being perforated to establish communication between the two chambers B and C.

H represents a removable cover which holds the part E in place and by the removal of which said part can be taken out and the retort emptied. The chambers B and C are not of uniform diameter from end to end the chamber B having a slight flare toward its lower end and the chamber C being slightly contracted toward its lower end. The upper end of the chamber B has a removable cover plate I and the upper end of the chamber C communicates with a hopper J. A feed screw K is mounted to operate within said hopper and said feed screw is provided with a bevel gear $k$ which meshes with corresponding gears $l$ on the drive shaft L. These drive shafts as shown in Fig. 1 extend across the battery of retorts there being one for each pair and the several driving shafts are intergeared so that they may all be driven simultaneously, and from a single driver. Each of the hoppers communicates by a feed pipe M which has a cover N for its upper end and they also have communication through pipes O provided with a suitable valve with a header P having an outlet pipe Q.

The chambers B of the retorts will be charged with lime rock broken to suitable size and the chambers C will be charged with broken or pulverized charcoal, this material being fed into the pipes M so as to constitute a store from which the screws K will continuously draw so as to keep these chambers completely filled. The furnace being charged with fuel the flame thereof will pass upwardly around the retorts and when the proper temperature is attained the decomposition of the limestone will begin. The $CO_2$ gas evolved therefrom passes through the apertures $d$ into and through the body of charcoal in the chambers C and thence upwardly through the hopper, the body of charcoal in the pipes M and through the pipe O to the header or reservoir P. The result of this operation is that the limestone is decomposed and the $CO_2$ gas passes through the highly heated carbon and is converted thereby into CO gas and this gas while hot passes through the mass of charcoal in the feed pipes M thus imparting its heat to the charcoal and preliminarily fitting it to be charged in the retort, and, at the same time, thoroughly filtering the gas through the charcoal mass. The gas in the uptake pipes will have a temperature of approximately one-third to one-half the temperature to which the carbonaceous material must be raised to accomplish the reduction of the carbon dioxid to carbon monoxid. I therefore preferably make the combined uptake and feed pipes of considerable length and of such area that the gas will give up practically all of its sensible heat to the carbonaceous material on its way to the retort and an economy is thus effected equal to the heat units necessary to be consumed in raising the temperature of the carbonaceous material to the degree attained by absorption from the gas. I prefer to connect each of the retorts independently to the header or reservoir P and to provide each with its own supply pipe and it will be noted that after the retorts are heated up there will be maintained continuously a mass of heated carbonaceous material in the chambers C and the ash will be constantly forced into the lower end of the chamber and can be removed when the retort is opened for the removal of the lime.

By means of this novel form of apparatus the gas evolved from the limestone of necessity passes through the bed of glowing carbonaceous material while the ash from the carbonaceous material is prevented from mingling with the lime which would not only retard the operation of producing gas but would also introduce an impurity into the lime itself. During this operation too there is always present such an amount of carbon as to reduce the $CO_2$ gas as evolved, with the result that all of the $CO_2$ gas is reduced to CO gas before it leaves the retort.

While I prefer the form and arrangement of apparatus described, it will be understood that such apparatus may be varied in construction without departing from the scope of the invention and that the several novel features herein described need not be used conjointly. The general requirement of such an apparatus to conform to the scope of my invention is that it shall permit of the physical separation of the carbonaceous material from the limestone, but this might be accomplished in a retort of different construction and arrangement than herein described. Again, in order to effect a saving in the operation I have shown a specific means for utilizing the heat of the gas as it leaves the retort to preliminarily heat the carbonaceous material, but the specific means by which this is accomplished may be varied.

From the foregoing specification it will be apparent that the carbon dioxid gas expands at once into the space filled with the glowing carbonaceous material and this material is of sufficient bulk to at once convert or reduce all the $CO_2$ gas to CO gas, the decomposition proceeding at an even rate and without the formation of silicates or aluminates in the lime or the mingling of ash therewith. It will further be observed that according to this method the retort will be hot when a fresh charge of limestone is put in and gas will begin to be evolved therefrom when the calcining temperature is reached, such gas passing immediately into and through the glowing carbonaceous material whereby it is converted into CO gas and this in turn is passed directly into and through the incoming carbonaceous material which is being constantly fed into the retort, thus effecting the preliminary heating of such carbonaceous material which reaches the retort at such temperature that it will immediately glow.

By the method and means above described the operation is practically continuous no interruption being required except for the removal of the lime and the charging of the limerock and this may be effected without allowing the retort to cool. Furthermore the ash of the carbonaceous material is prevented from mingling with the lime and by the physical separation of the materials the pressure within the retort is CO pressure only and does not interfere with or retard the evolution of $CO_2$ gas from the limestone. Furthermore the absence of $CO_2$ pressure in the retorts makes it possible to carry on the process economically with a lower vacuum in the retorts enabling the CO gas to be withdrawn without drawing air into the system, thus resulting in a purer gas and greater economy.

Attention is directed to the fact that an application describing and claiming the apparatus set out in this application was filed by me on January 11, 1909, Serial No. 471,634.

I claim:

1. The herein-described process of producing fuel gas which consists in decomposing a mineral carbonate by heating in an air-tight retort and causing the gas as evolved to pass through an incandescent mass of carbonaceous material maintained in close proximity to but unmixed with the carbonate, substantially as described.

2. The herein-described process of producing fuel gas which consists in decomposing a mineral carbonate by heat in an air-tight retort evolving the gas directly into a mass of incandescent carbonaceous material, and continuously feeding carbonaceous material into the retort, substantially as described.

3. The herein-described process of producing fuel gas which consists in decomposing a mineral carbonate by heat in an air-tight retort evolving the gas directly into a mass of incandescent carbonaceous material, and maintaining the volume of said carbonaceous material in said retort substantially constant, substantially as described.

4. The herein-described process of producing fuel gas which consists in decomposing a mineral carbonate by heat in an air-tight retort evolving the gas directly into a mass of incandescent carbonaceous material, and preliminarily heating a body of carbonaceous material by the heat of said gas after its conversion by said incandescent carbonaceous material, substantially as described.

5. The herein-described process of producing fuel gas which consists in decomposing a mineral carbonate by heating in an air-tight retort and causing the gas as evolved to pass through an incandescent mass of carbonaceous material maintained in proximity to but out of contact with the carbonate.

6. The herein-described process of producing fuel gas which consists in decomposing a mineral carbonate, such as limestone, by heat within a sealed retort or chamber and passing the gas, as evolved, through an incandescent mass of carbonaceous material maintained in proximity thereto but out of contact therewith and then passing the converted gas through a body of carbonaceous material whereby to preliminarily heat the same, substantially as described.

7. The herein-described process of producing fuel gas which consists in charging a mineral carbonate into a chamber in an air-tight retort, continuously feeding a carbonaceous material into a chamber in proximity to and communicating with the chamber containing the mineral carbonate, decomposing the latter by heat to produce $CO_2$ gas, passing said gas, as evolved, through an incandescent portion of said carbonaceous material whereby to convert the same into CO gas and then pass the CO gas in the heated condition through the in-coming carbonaceous material whereby to preliminarily heat the latter, and drawing off the gas as evolved, substantially as described.

GEORGE G. FLOYD.

Witnesses:
E. B. SHERZER,
JAS. H. LOUIE.